United States Patent [19]
Want et al.

[11] Patent Number: 5,825,675
[45] Date of Patent: Oct. 20, 1998

[54] APPARATUS AND CONFIGURATION METHOD FOR A SMALL, HAND-HELD COMPUTING DEVICE

[75] Inventors: Roy Want, Mountain View; Jennifer P. Collins, Hermosa Beach, both of Calif.

[73] Assignee: Xerox Corporation, Rochester, N.Y.

[21] Appl. No.: 446,389

[22] Filed: May 22, 1995

Related U.S. Application Data

[63] Continuation of Ser. No. 99,686, Jul. 29, 1993, abandoned.

[51] Int. Cl.$^6$ ........................................................ G06F 1/00
[52] U.S. Cl. ........................................................... 364/708.1
[58] Field of Search ........................... 364/708.1, 709.12, 364/705.01, 705.05, 705.06, 705.08; 341/23, 21; 345/168, 169; 361/680, 681; D18/6, 7, 11

[56] References Cited

U.S. PATENT DOCUMENTS

| | | | |
|---|---|---|---|
| 4,005,388 | 1/1977 | Morley et al. | 345/169 X |
| 4,062,181 | 12/1977 | Zurcher | 364/705.01 |
| 4,120,036 | 10/1978 | Maeda et al. | 364/705.07 |
| 4,120,038 | 10/1978 | Stieringer | 364/705.01 |
| 5,103,376 | 4/1992 | Blonder | 361/680 |
| 5,109,354 | 4/1992 | Yamashita et al. | 364/708 |
| 5,128,672 | 7/1992 | Kaehler | 341/23 |
| 5,432,510 | 7/1995 | Matthews | 364/709.12 |

FOREIGN PATENT DOCUMENTS

| | | |
|---|---|---|
| 0 104 709 | 4/1984 | European Pat. Off. |
| 0 398 055 | 11/1990 | European Pat. Off. |
| 0 458 316 A2 | 11/1991 | European Pat. Off. |
| 0 539 599 A1 | 5/1993 | European Pat. Off. |

OTHER PUBLICATIONS

Patent Abstracts of Japan, vol. 16, No. 313, p. 138, Jul. 9, 1992 JP 4–88545 (Sony Corp) 23 Mar. 1992 *abstract*.
Weiser, M., "Some Computer Science Issues in Ubiquitous Computing", *Communications of the Association for Computing Machinery*, vol. 36, No. 7, Jul. 1993, New York, US, pp. 75–84.
Patent Abstracts of Japan, vol. 16, No. 313 (P–1383) 9 Jul. 1992 and JP–A–04 088 546 (Sony) 23 Mar. 1992 *abstract* and English translation.
IBM Technical Disclosure Bulletin, vol. 34, No. 10B, Mar. 1992, New York US, pp. 413–414, "Stylus–Based Interface With Full Mouse Emulation", p. 414.
Patent Abstracts of Japan, vol. 14, No. 129, 12 Mar. 1990 and JP–A–02 000 898 (Sony Tektronix) 5 Jan. 1990 *abstract*.

Primary Examiner—Tan V. Mai
Attorney, Agent, or Firm—Townsend and Townsend and Crew LLP

[57] ABSTRACT

A hand-held computer having symmetrically placed buttons on one side so that left or right handed operation by the grasping hand is easily achieved. The hand-held computer includes a configuration method so that the functions of buttons and the orientation of images on the display screen can be adjusted for left or right handed use of the computer. Stylus input is modified by button presses thereby allowing more flexibility in inputing information to the computer. The computer includes rounded buttons as an aid to holding and operating the computer so as to improve operator comfort.

21 Claims, 10 Drawing Sheets

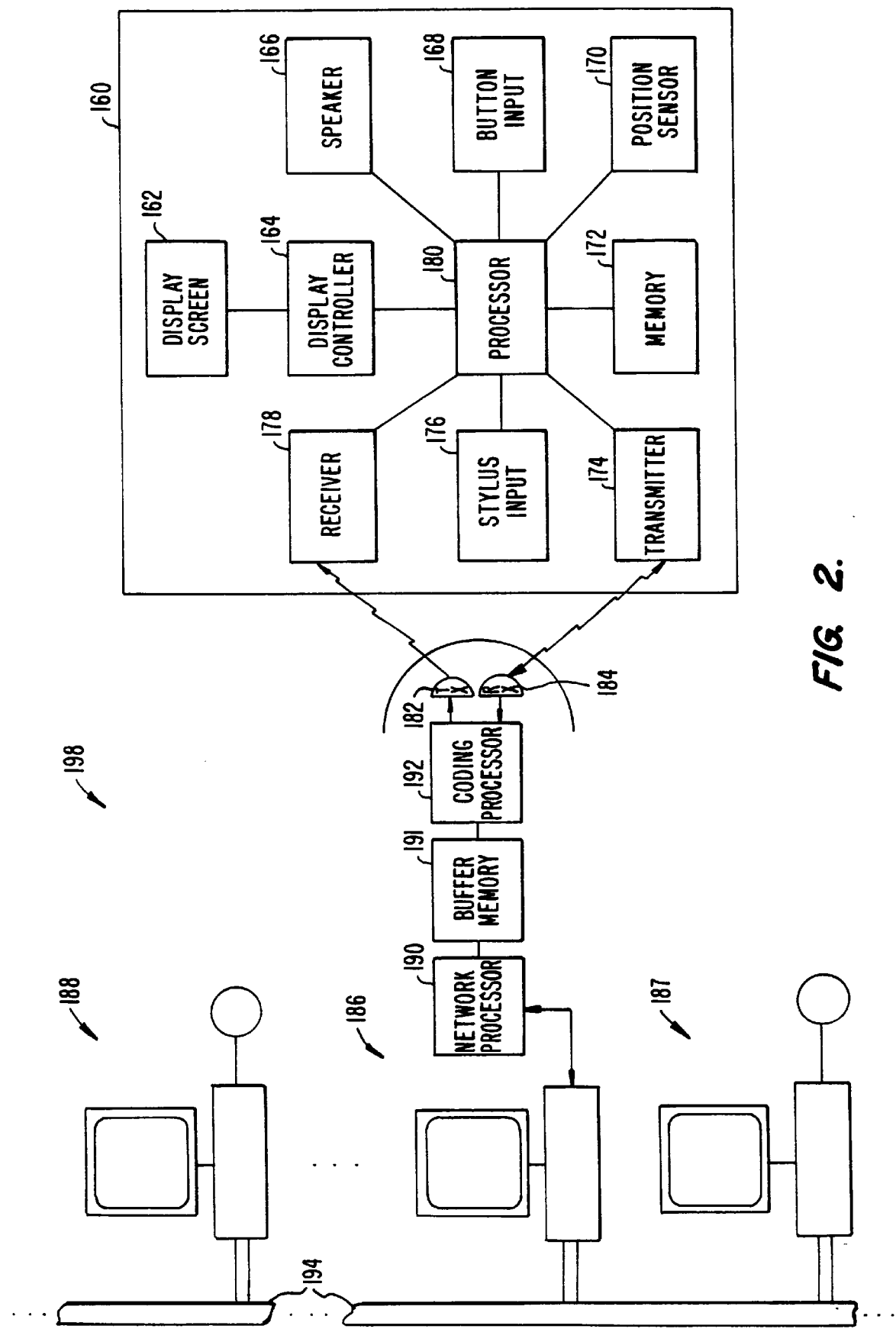

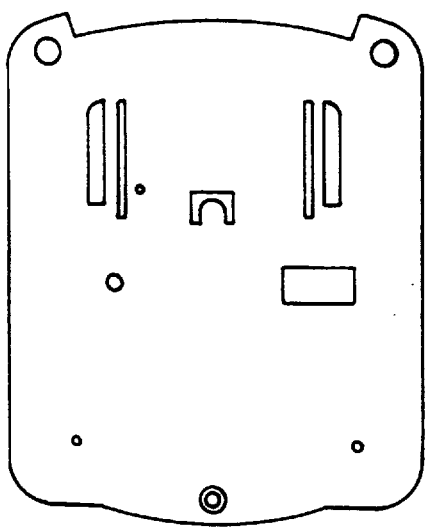
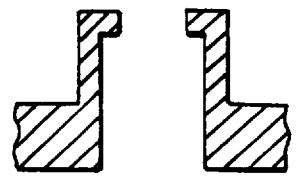
FIG. 8A.  FIG. 8B.  FIG. 8C.
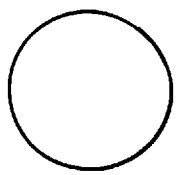
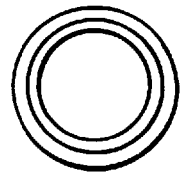
FIG. 8D.  FIG. 8E.  FIG. 8F.
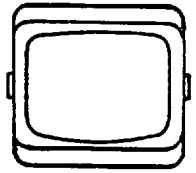
FIG. 8G.
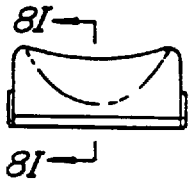
FIG. 8H.  FIG. 8I.  FIG. 8J.

APPARATUS AND CONFIGURATION METHOD FOR A SMALL, HAND-HELD COMPUTING DEVICE

This is a continuation of application Ser. No. 08/099,686, filed Jul. 29, 1993, now abandoned.

FIELD OF THE INVENTION

This invention relates generally to computing devices and specifically to a hand-held computing device.

BACKGROUND OF THE INVENTION

Computer systems have gradually been reduced in size so that the power of a computer system that once filled a room can now be made to fit in the palm of a hand. However, with this miniaturization of computing power comes new problems in interfacing with the computer system when the computer system resides in a very small package.

In large scale, or "mainframe," computer systems human interfacing with the computer was achieved by a variety of means. These included front panel switches, card readers, paper tape, computer terminals, light pens, and other means. Several operators were required to maintain the system for dozens or even hundreds of users. Today, personal computers provide computer systems dedicated to one or a few users. Interfacing with a personal computer is typically by means of a typewriter-style keyboard and "mouse". Other personal computer input/output ("I/O") devices are available such as touch screens, digitizing tablets, microphone and speaker, joy stick, trackball, etc. Currently, "virtual reality" related types of I/O devices are available for personal computers such as head-mounted stereoscopic viewing goggles or a data glove.

A step down in size from a personal computer is a "laptop" or "notebook" computer. Laptop computers typically use a compact keyboard for input and a flat-panel display screen for output. Some laptops use a small "track ball" or a movable key on the keyboard as an additional input means for moving a cursor on the display. Other input devices may be connected to the laptop computer.

When a computer system is made small enough to be held in a single hand, the above I/O devices are, for the most part, undesirable or impossible to use. This is because the user no longer has complete use of both hands for inputing information. For example, the traditional typewriter keyboard is hard to implement well in a hand-held computer since it requires the use of the fingers of both hands to operate it efficiently and since it requires a substantial area for the placement of all of the keys onto a solid surface. In a hand-held computer, not only is the size of the unit itself smaller than that required for the keyboard, but the user only has one free hand to manipulate an input device with the other hand (holding the computer) having very limited movement. This is a distinct disadvantage in the design of input devices for hand-held computers since the efficient entry of alphanumeric information plays a significant part in all computer systems.

The hand-held computer is limited in its output devices, also. If a display screen is used on a hand-held computer it must be limited to a few square inches instead of the tens of square inches available on display screens in laptop or personal computers. One way to overcome this problem is to allow the display in a hand-held computer to be used as a scrolling window over an image that is too large to be displayed all at once. However, providing an efficient mechanism by which the user of a hand-held computer can both scroll the window and input data to the computer presents a problem.

Another concern in the design of a hand-held computer is to provide for right and left "handedness" of the user. For example, one efficient means of user input in a hand-held computer is the use of a stylus that is held and manipulated in the same way as a typical pen or pencil. With the stylus, the display screen of the hand-held computer is used as the paper or pad being "written" upon. Since humans are either right or left-handed, a hand-held computer design that allows for a user to hold the computer in either the left or right hands and write with the free hand is highly desirable as this would allow either type of user to operate the computer. However, such an "either handed" design is complicated if the hand-held computer requires the holding hand to manipulate input controls. This typically means that the controls, if designed, e.g., for the fingers of the left hand, are not operable in the same way by the fingers of the right hand.

Finally, the physical design of a hand-held computer should be ergonomic so that the computer is comfortable to hold and not strenuous to operate, thereby reducing operator fatigue and the chance of injury.

SUMMARY OF THE INVENTION

The present invention provides a design for a hand-held computer that overcomes the above problems. In the present invention, a hand-held computing device includes a housing having a first axis. The housing has a first side that is oriented substantially perpendicular to the first axis. Input means are coupled to the first side and are arranged symmetrically with respect to the first axis. In a preferred embodiment, three buttons are coupled to the first side and the buttons are arranged in a row symmetrically with the first axis. This allows a user to hold the device, e.g., in the left hand with the first, second and third fingers operating the buttons. The device can also be held in the right hand with the first, second and third fingers of right hand operating the same three buttons in a similar way.

The present invention also provides a hand-held computing device including a housing and a display screen coupled to the housing. Stylus sensing means is used to determine the position of a stylus, as manipulated by the free hand of the user, near the display screen. Input means are provided coupled to the housing to allow the user to indicate first and second stylus modes. Processing means within the housing governs the display of information on the screen in response to signals from the stylus sensing means and the input means. Stylus mode control means are also included that are responsive to the input means for controlling the response of the processor to signals from the stylus sensing means.

In a preferred embodiment, a user uses the stylus to input strokes into the hand-held computer. The way that these strokes are interpreted by the computer is determined by the user's manipulations of the input means, e.g., depressing one or more buttons on the housing.

The present invention provides a design where a hand-held computing device includes a housing substantially fitting within the palm of the user's hand so that when the housing is held, the fingers are curved around the housing. A button is slidably coupled to the housing and operable by a finger of the user's holding hand, wherein the direction of slide of the button is substantially parallel to a line from the second to the first knuckle of the operating finger and a convex surface is provided on the button on the side of the button facing the operating finger. The convex surface substantially follows the curved shape of the operating finger. The provision of the convex surface on the button reduces operator fatigue and allows the operator to comfortably hold the computer and to operate the button.

BRIEF DESCRIPTION OF THE DRAWINGS

FIG. 2 is a block diagram showing the system level organization of the present invention;

DESCRIPTION OF THE PREFERRED EMBODIMENT

Figure 1A:
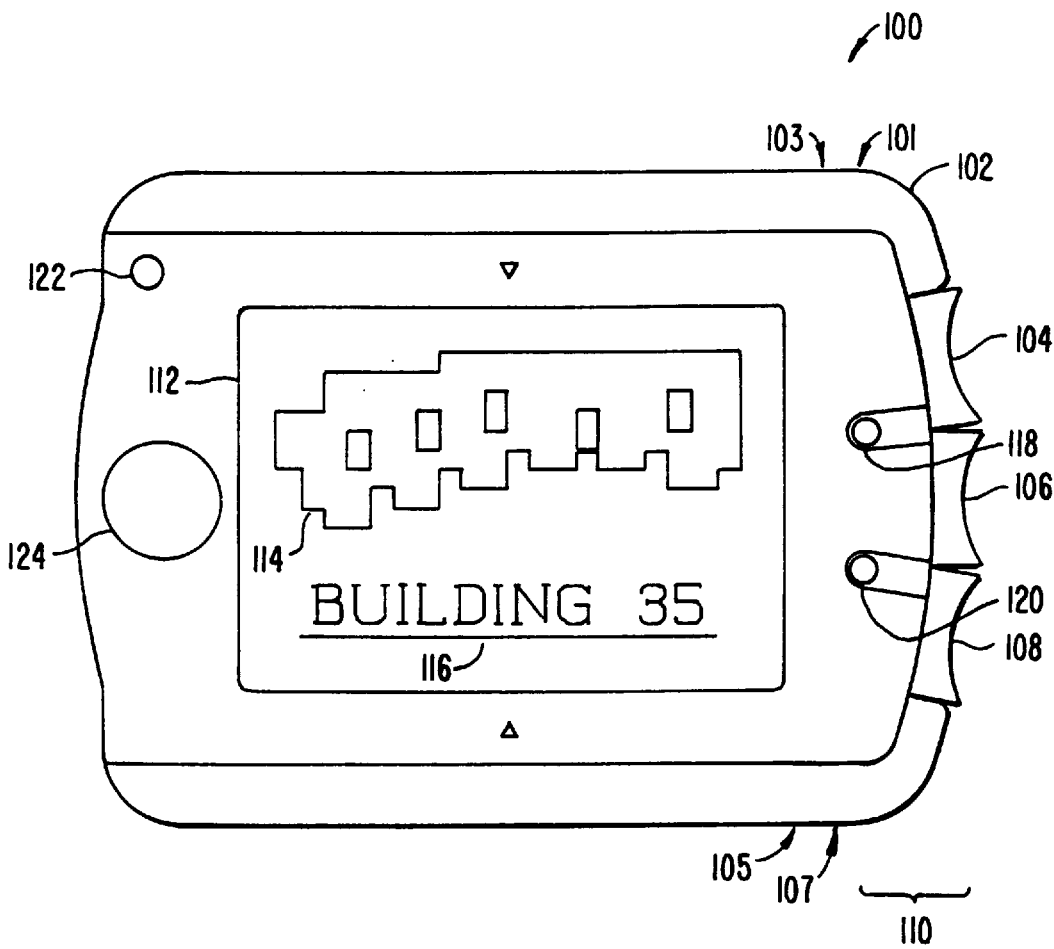
FIG. 1A is a top view of the hand-held computer of the present invention.
Figure 8K:
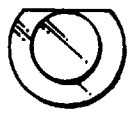
FIGS. 8A–8AC show technical drawings of the housing of the hand-held computer.
Figure 8L:
Figure 8M:
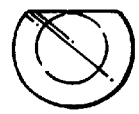
Figure 8Q:
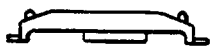
Figure 8N:
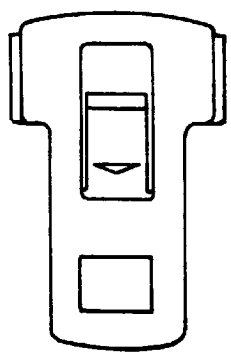
Figure 8O:
Figure 8P:
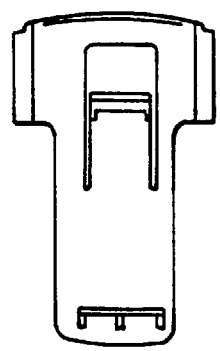
Figure 8U:
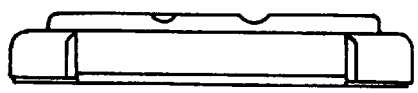
Figure 8R:
Figure 8S:
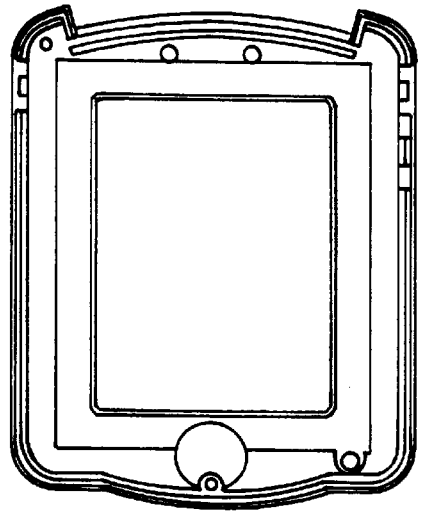
Figure 8T:
Figure 8V:
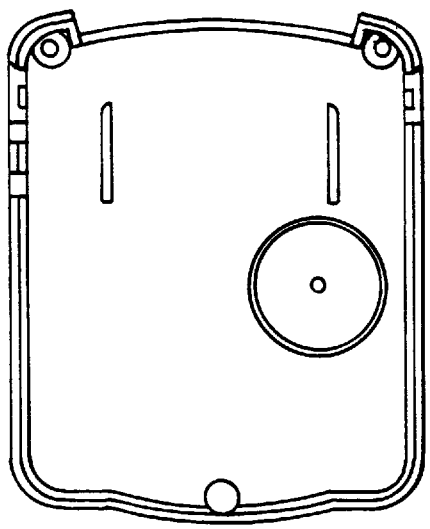
Figure 8W:
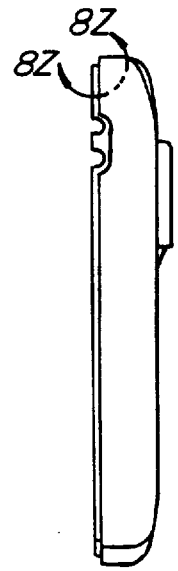
Figure 8X:
Figure 8Y:
Figure 8Z:
Figure 8A:
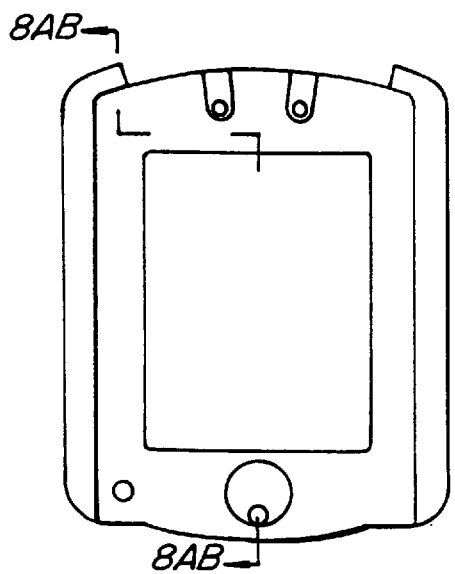
Figure 8A:
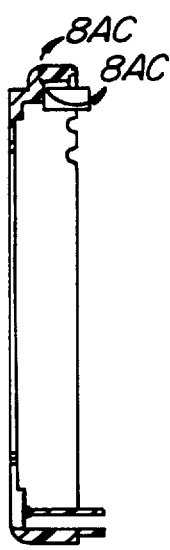
Figure 8A:

FIG. 1A is a top view of the hand-held computer 100 of the present invention. FIG. 1A is about 30% larger than a preferred embodiment of the actual device. A prototype product embodying the invention is designated as the "TAB" computer. Technical drawings providing a detailed disclosure of the housing of the computer are provided in FIGS. 8A–8AC. In FIG. 1A, housing 102 includes buttons such as first button 104, second button 106 and third button 108 arranged along side 110 of hand-held computer 100.

FIG. 1A also shows display screen 112 mounted on a surface of housing 102. Display screen 112 is shown having images such as graphic symbol 114 and text and numbers 116. In a preferred embodiment, display screen 112 is a liquid crystal display screen that includes a touch-sensitive surface for sensing the position of a stylus (not shown) when the stylus is brought into contact with the screen. The touch screen can also sense, for example, finger pressure so that a user may input signals to hand-held computer 100 by touching the screen with the stylus, a fingertip or other object.

Also shown in FIG. 1A are infrared light emitting diodes ("LEDs") at 118 and 120, photo detector window 122 and infrared LED receiver 124.

Figure 1B:
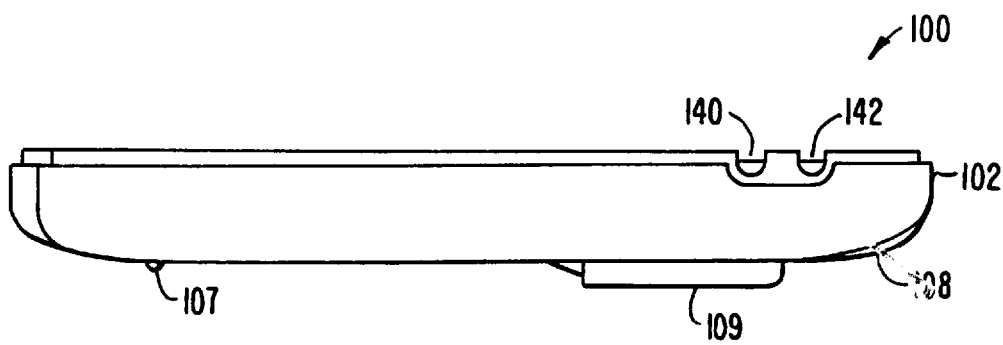
FIG. 1B is a side view of the hand-held computer of the present invention.

FIG. 1B illustrates the side view of hand-held computer 100 of the present invention. In general, like numbers used in different Figures indicate the same item. FIG. 1B shows housing 102 of hand-held computer 100 from the side. LED transmitters are shown at 140 and 142 of FIG. 1B. Button 108 is shown slightly protruding from housing 102 in FIG. 1B.

There are two LEDs on the opposite side of the computer from the side shown in FIG. 1B. The LEDs on the opposite side (not shown) are analogously placed to LED transmitters 140 and 142 so that they are located perpendicularly across the longitudinal axis of the device from LED transmitters 140 and 142. Thus, the hand-held computer has six LED transmitters, 118, 120, and four more placed approximately at 101, 103, 105 and 107, as shown in FIG. 1A. The placement of the LED transmitters is chosen so that when the device is held and operated, at least four of the LEDs are advantageously oriented toward the room's infrared transmitter/receiver and not obscured by the users hand. Infrared receiver 124 is located as far away as possible from the transmitters yet is positioned so as not to be significantly obscured regardless of whether the computer is held in the left or right hands.

FIG. 2 is a block diagram showing the system level organization of the present invention. FIG. 2 illustrates functions performed by subsystems enclosed in rectangular blocks. The rectangular blocks within boundary 160 are functions that are performed by hardware or software within or coupled to housing 102 of hand-held computer 100 of FIG. 1A. Thus, the hand-held computer of the present invention includes means for performing the functions of display screen 162, display controller 164, speaker 166, button input 168, position sensor 170, memory 172, transmitter 174, stylus input 176, receiver 178, and processor 180. These subsystems communicate with one or more applications programs that are executed on one or more computers such as computer 186 in a distributed network 198 that is external to the hand-held computer. Communication between the application software and subsystems in the hand-held computer is via infrared signals transmitted by transmitter 174 and received by receiver 178 on the hand-held computer side. Each computer in distributed computer 198 is coupled to an infrared transmitter and receiver typically located in the ceiling of the room within which the hand-held computer is being used.

Transmitter 182 and receiver 184 for computer 186 are shown in FIG. 2. Transmitter 182 and receiver 184 are coupled to processor 186 through coding processor 192, buffer memory 191 and network processor 190 that convert infrared signals to digital signals and vice-versa. Computer 186 is thus in communication with processor 180 of the hand-held computer. Computer 186 may also be coupled to one or more other computers as shown by connections to computer 187 and computer 188 by bus 194. Computer 186 is used to execute the software of an application program for performing a variety of computing functions.

For example, an office building equipped with a transmitter/receiver in each office would allow users of hand-held computers to communicate with each other to exchange messages, schedule trips and coordinate meetings. Sensors could be incorporated into the network to provide the outside weather conditions or whether someone was present that day. Control functions could be interfaced to the network so that, for example, the room temperature could be adjusted, lighting can be turned on or off, devices such as a coffee machine can be controlled, etc.

The implementation of each of the functional blocks shown in FIG. 2 may be by widely varying means as are known in the art. For example, computers such as 186 and 188 may be any of a variety of commercially available computers. Processor 180 may be any of a variety of microprocessors typically embodied in integrated circuit chips. Memory such as memory 172 may be volatile or non-volatile memory including solid state, magnetic, bubble memory, read-only memory, etc. Display screen 162 may be a liquid crystal display, electroluminescent display, plasma display, cathode ray tube, etc. Stylus input 176 may be implemented by a pressure sensitive surface, light beam or other proximity sensing means. Distributed network 198 represents any generalized computer network such as a bus, star, ring, etc., network. FIG. 2 merely illustrates the functional aspects of the hand-held computer of the present invention, shown within box 160, and the relationship of these functional aspects to an external computer network.

FIGS. 3A–D show the hand-held computer of the present invention in relation to the fingers of a user's hand during operation of the hand-held computer. In FIGS. 3A–D, some of the detail has been omitted for clarity and ease of discussion.

Figure 3A:
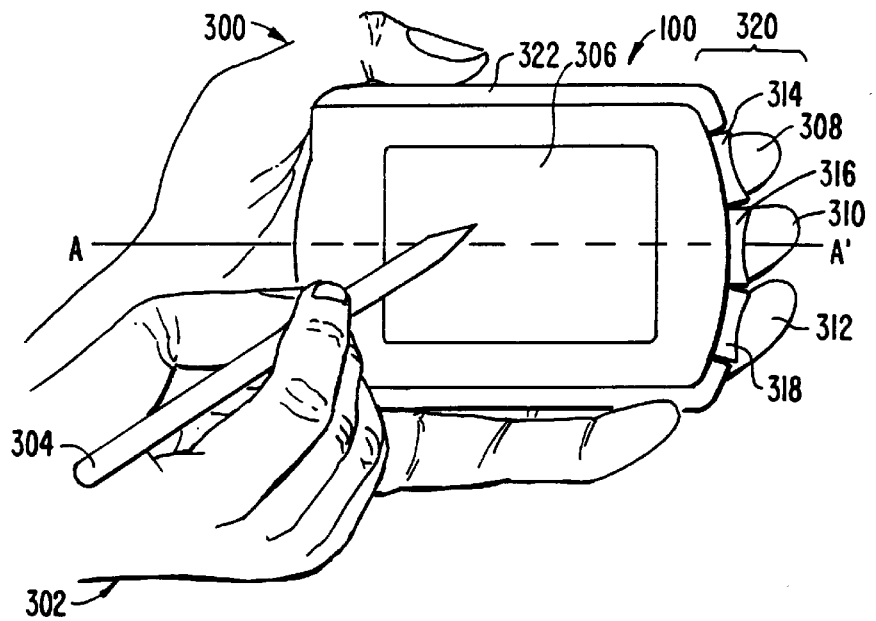
FIG. 3A shows a top view of the hand-held computer being held and operated by a user's left hand.

In FIG. 3A, hand-held computer 100 is shown being held by the left-hand 300 of a user while the user's right hand 302 is shown holding a stylus 304 in contact with display screen 306 (referred to herein as a "left held" configuration). FIG. 3A shows the position of the user's fingers in relation to the control buttons of the present invention. In FIG. 3A, the user's left index finger 308, left middle finger 310, and left ring finger 312 are shown in contact with first button 314, second button 316, and third button 318, respectively. Buttons 314–318 are arranged at the right side 320 of hand-held computer 100. Buttons 314–318 are also arranged symmetrically with respect to line A–A'. Since the three buttons 314–318 are arranged in a row, they are actually symmetrical to a plane normal to the page and passing through the line A–A'. Line A–A' is approximately centered along the major axis of hand-held computer 100.

Figure 3B:
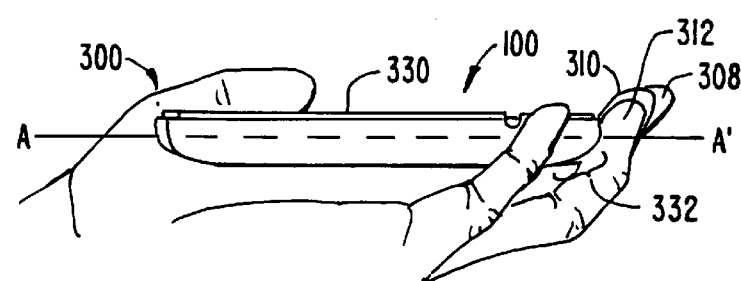
FIG. 3B shows a side view of the hand-held computer being held and operated by a user's left hand.

FIG. 3B shows line A–A' in a side view of hand-held computer 100. FIG. 3B also illustrates the user's left hand 300 in a side view as it grips hand-held computer 100 in the same manner as in FIG. 3A. The display screen 306 is not visible in FIG. 3B but is attached to the top surface 330 of hand-held computer 100 shown in FIG. 3B. Also not visible are first button 314 and second button 316. However, a small portion of button 318 is shown at 332. Also visible are portions of left first finger 308, left middle finger 310 and left ring finger 312. Note that the portion of button 318 shown at 332 is slightly curved, giving the button a convex shape so that the button more closely follows the curvature of left ring finger 312 when the user is holding hand-held computer 100. This curvature is more clearly shown in FIG. 1B which is an expanded view of hand-held computer 100 without the illustration of the user's hand, and in the technical drawings of FIGS. 8A–T.

Figure 3C:
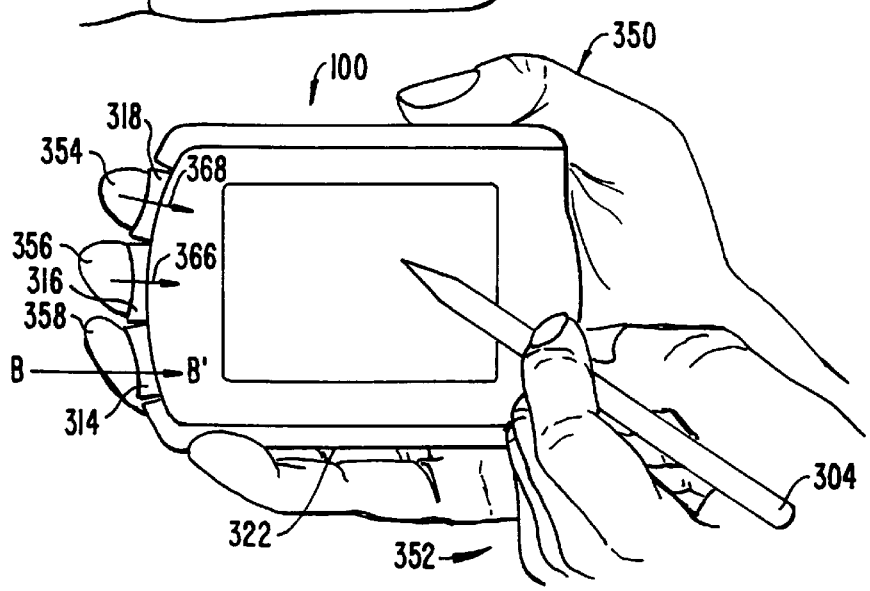
FIG. 3C shows a top view of the hand-held computer being held and operated by a user's right hand.

FIG. 3C shows hand-held computer 100 being held in a user's right hand 350 (a "right held" configuration). In FIG. 3C, the user's left hand 352 now holds stylus 304. In FIG. 3C, the user's right index finger 354, right middle finger 356 and right ring finger 358 are shown. However, right index finger 354 operates a different button than left index finger 308 of FIG. 3A. This is because hand-held computer 100 has been turned upside-down from its orientation in FIG. 3A. Thus, top edge 322 of FIG. 3A is now toward the bottom of the illustration in FIG. 3C.

In turning hand-held computer 100 upside-down, first button 314 now contacts right ring finger 358, second button 316 contacts right middle finger 356 and third button 318 contacts right index finger 354. Thus, the buttons operated by the first and ring fingers are switched when the hand-held computer 100 is held in the right hand as opposed to being held in the left hand.

Figure 3D:
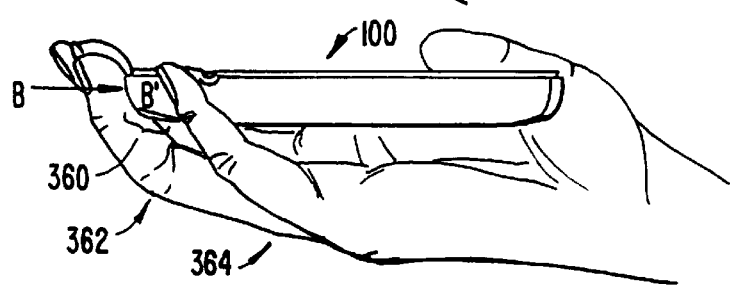
FIG. 3D shows a side view of the hand-held computer being held and operated by a user's right hand.

FIG. 3D shows hand-held computer 100 in a side view still being held in the user's right hand, the same hand as is holding hand-held computer 100 in FIG. 3C. In FIG. 3D, a portion of button 314 can be seen at 360. Button 314 is thus seen to have a similar curvature to button 318 as shown in FIG. 3B and as further detailed in FIG. 1B as explained above. Button 316 (not shown) has a similar curvature. By giving the portions of buttons 314, 316 and 318 smoothly curving convex surfaces where the buttons are facing or in contact with the fingers of the holding or operating hand, the ability of the user to easily grasp and operate the hand-held computer is improved.

A further aid in contour-fitting the hand-held computer to the user's hand is belt clip 109. While the primary function of the belt clip is to allow the computer to be attached to a belt to free the user's hands, a secondary function is to allow the mid-sections of the user's grasping hand to further support the computer. Nub 107 of FIG. 1B is provided so that hand-held computer 100 will sit "flat" on a flat surface, such as a desktop, when the computer is placed down and viewed without being held. The belt clip is detachable.

FIGS. 3C and 3D also illustrate the direction of movement of buttons 314–318. In FIG. 3C, button 314 is shown as having a sliding direction from B to B'. Arrows 366 and 368 show the directions of slide of buttons 316 and 318, respectively. In FIG. 3D, the direction along B–B' is also shown corresponding to the direction of slide of button 314. This direction can also be approximately defined as the direction substantially parallel with a line drawn from the second to first knuckles of the user's right ring finger as shown in FIG. 3D by noting second knuckle 362 and first knuckle 364 of the user's right ring finger. This direction is "into" hand-held computer 100 or towards the palm of the user's holding hand.

Thus, FIGS. 3A–D show how the hand-held computer of the present invention is capable of being held in either the left or right hands in a left held or right held configuration. Buttons on the hand-held computer are operable with the holding hand by using the first, middle and ring fingers of the holding hand to depress the buttons located at the side of the computer. The way in which the hand-held computer is operated with either the left or right holding hand is essentially the same, except that the buttons operated by the first and ring fingers are switched when the computer is held in the right hand as compared to the left hand. FIGS. 3B and 3D also show the advantage of having the buttons shaped in a smooth convex curve to more closely follow the contour of fingers of the grasping hand to allow the user to more easily hold and operate the hand-held computer. For the exact specifications of the button curvatures, refer to the technical drawings in FIGS. 8A–T of this specification.

Figure 4A:
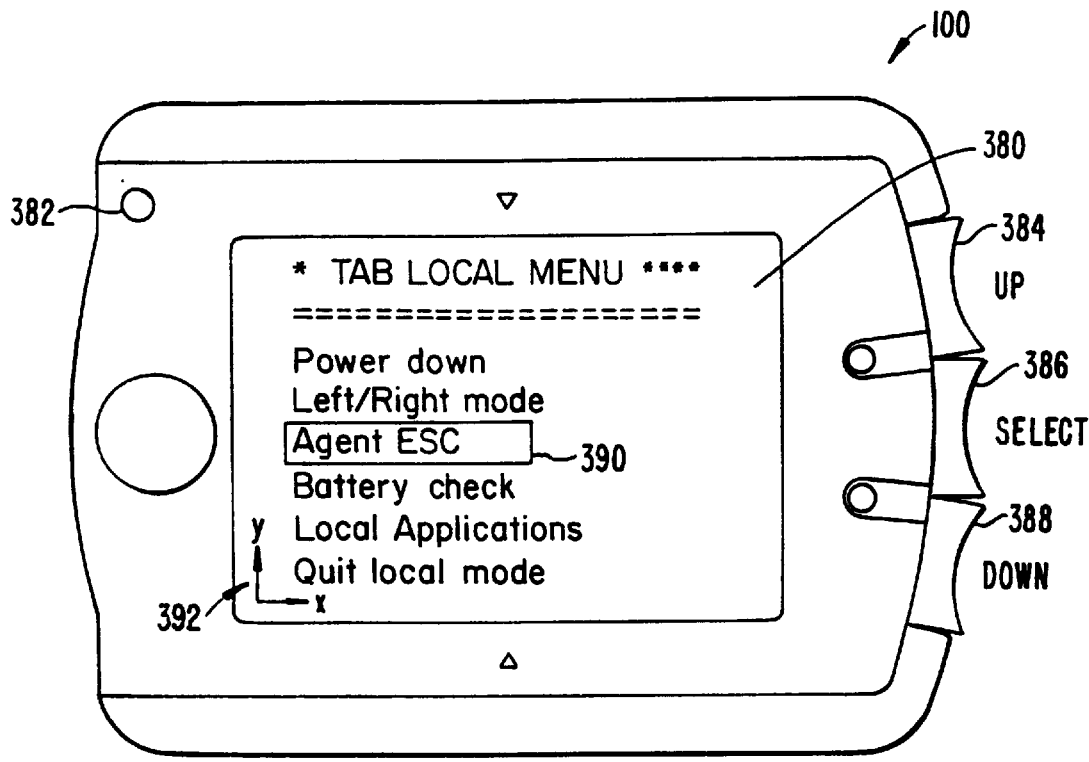
FIG. 4A illustrates the hand-held computer as it functions in a left held configuration.
Figure 4B:
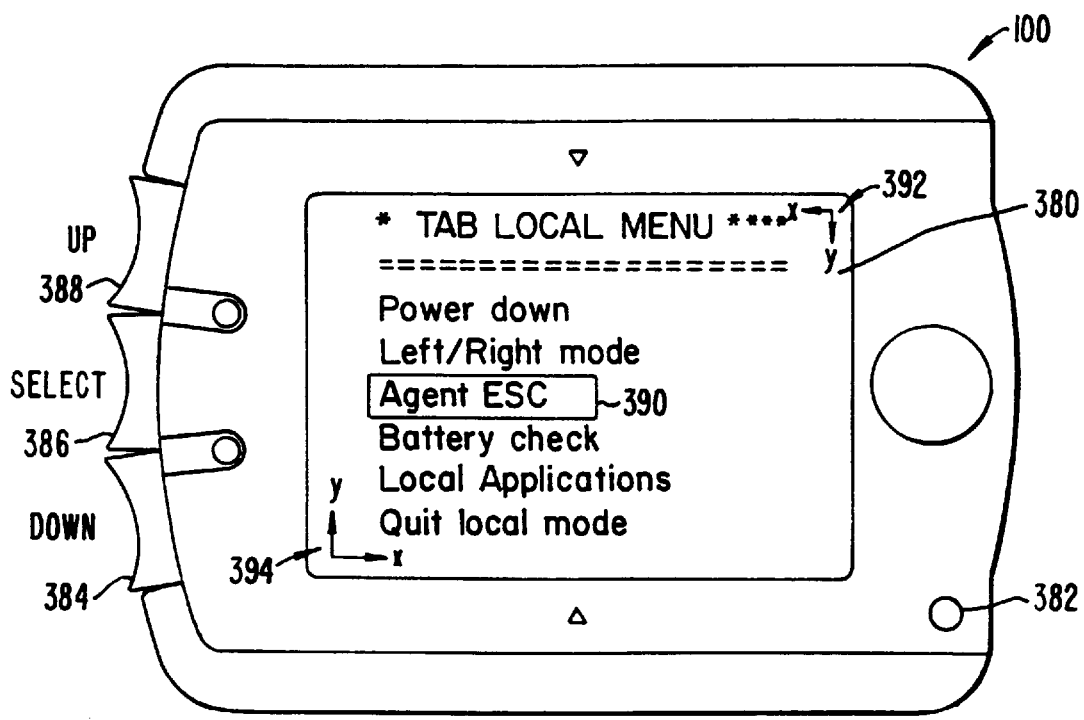
FIG. 4B illustrates the hand-held computer as it functions in a right held configuration.
Figure 5:
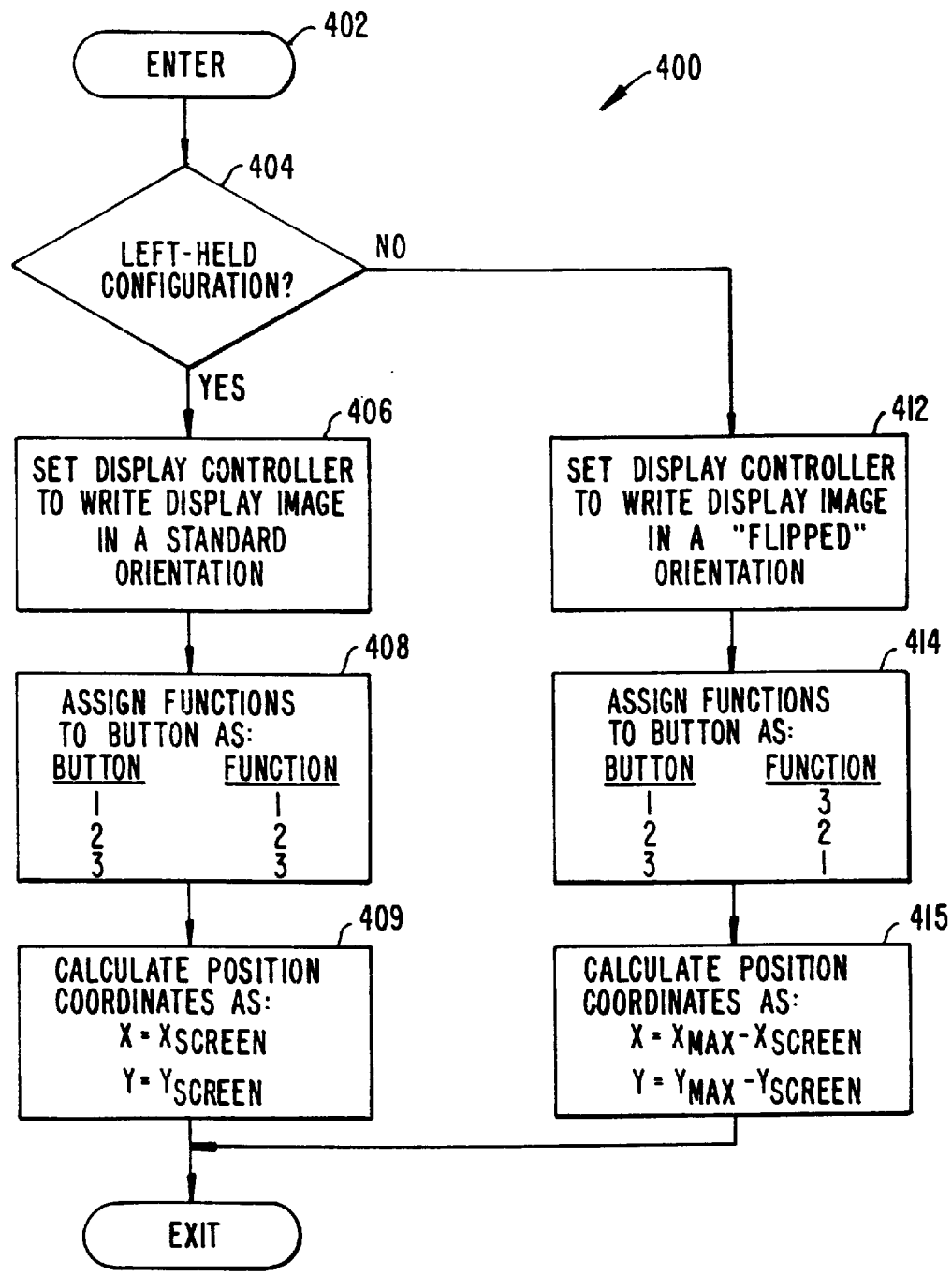
FIG. 5 shows a flowchart of a routine to handle button function re-assignment, stylus coordinate mapping and display re-orientation in the hand-held computer of the present invention.

FIGS. 4A, 4B and 5 will next be discussed to describe how the hand-held computer of the present invention assigns functions to the buttons and "flips" the display in order to accommodate left held or right held operation.

FIG. 4A illustrates hand-held computer 100 of the present invention as it functions in a left held configuration. FIG. 4B illustrates hand-held computer 100 as it functions in a right held configuration.

In FIG. 4A, showing the left held configuration, photo-detector window 382 is shown at the top of hand-held computer 100. In FIG. 4B, hand-held computer 100 is turned upside down from its orientation in FIG. 4A so that photodetector window 382 is now at the bottom edge of hand-held computer 100. Photodetector window 382 is used to sense ambient light levels to turn certain functions of the hand-held computer off when the room lights are off. Photodetector window 382 is of interest here as a way to identify the orientation of hand-held computer 100 in the Figures. Note that, even though in FIG. 4B the hand-held computer is turned upside down from its orientation in FIG. 4A, the text on display screen 380 in FIG. 4B is still right-side up and readable. This is due to processor 180 and display controller 164 of FIG. 2 reorienting the display image so that it is readable when hand-held computer 100 is used in a right held configuration.

FIGS. 4A and 4B show a menu labelled "TAB Local Menu" on display screen 380. The menu contains menu items "Power down", "Left/Right mode", "Agent ESC", "Battery check", "Local Applications", and "Quit local mode".

Referring to FIG. 4A, buttons 384, 386, and 388 are given functions of, respectively, "UP," "SELECT," and "DOWN". Button 384 is used to move selection box 390 of FIG. 4A upwards through the menu items and button 388 is used to move selection box 390 downwards in the menu selection. When selection box 390 is moved to a different line, it encloses the item on that line. The menu item currently enclosed by the selection box is the "current" item.

For example, in FIG. 4A, when button 384 is depressed, selection box 390 will move upwards to enclose the selection "Left/Right mode". When button 388 is pressed with the display as shown in FIG. 4A, the selection box 390 will move downward to enclose menu item "Battery check". Depressing button 386 will select the current menu item enclosed in selection box 390. For example, depressing button 386 when bounding box 390 encloses the menu item "Battery check" hand-held computer 100 will issue commands to activate software and hardware to perform a battery check of the hand-held computer. In a preferred embodiment, the current item is indicated by displaying the line of the current item, e.g., "Agent ESC", in FIG. 4A, in reversed video.

In FIG. 4B, buttons 384, 386 and 388 perform the same functions, except that the functions assigned to buttons 384 and 388 have been switched from the assignment to the buttons in FIG. 4A. In other words, in FIG. 4B, button 388 now performs the "up" function while button 384 performs the "down" function. Thus, in the right held configuration shown in FIG. 4B, depressing button 388 with selection box 390 enclosing the term "Agent ESC" will cause bounding box 390 to move upwards to enclose menu item "Left/Right mode". Similarly, when button 384 is depressed with the display and configuration as shown in FIG. 4B, selection box 390 will move downwards to enclose menu item "Battery check". Button 386 has the same function in both the configurations shown in FIGS. 4A and 4B, namely, that of selecting the menu item enclosed by the selection box 390.

By providing buttons that are arranged symmetrically on one side of the hand-held computer both left held and right held operations can be performed in a manner which is intuitive to the user. In the example of FIGS. 4A and 4B, the index finger, in either the left held or right held configurations, moves the selection box upwards while the ring finger is used to move the selection box downwards. This provides a convenient user interface in either the left held or right held modes of operation since, as a user looks at the screen, the index finger is "above" the ring finger. Thus, the movement of the selection box utilizing the buttons as activated by the fingers of the holding hand is readily understandable by the user.

Note that the operation of menu item selection only involves the use of one of the user's hands. Namely, the grasping, or holding, hand. Thus, the hand-held computer of the present invention is capable of performing desirable functions in an efficient manner while only requiring manipulation by one of the user's hands.

As mentioned above, hand-held computer 100 includes means for "flipping" the display so that it is readable in a normal orientation in either the left held or right held configurations. Another way to describe the "flipping" of the display is as a rotation of each "on" display element or pixel in the display screen about a point located at the center of the display screen. The flipping of the display may be by any means as is commonly known in the art. For example, where the display is made up of an array of pixels, the pixels can be read left to right, top to bottom, starting from the upper left hand corner into a buffer and rewritten to the array in a "first-in, first-out" manner starting from the lower right corner of the array and going right to left, bottom to top.

The manner for assigning different functions to buttons 384, 386, and 388 may likewise be implemented by a variety of methods. For example, since the button positions are sensed by the processor, and since a processor (either the one in the hand-held computer or in the distributed system) is used to invoke the functions associated with the buttons, it is a simple manner, in software or hardware, to cause the invoking of a function dependent upon the state (i.e., depressed or not depressed) of a button. Software in the hand-held computer or the distributed system can easily reassign which button state invokes a given function.

Finally, software in the hand-held computer is also used to "map" coordinate position points on the touch-sensitive surface of the display screen so that the stylus position is sensed correctly whether the computer is operating in a left held or a right held configuration. In FIG. 4A, the lower-left-hand corner of the display is considered the origin and the X and Y axes are shown as axes 392. In FIG. 4B, the lower-left-hand corner is also considered the origin and the axes are shown as axes 394. In order for points to map similarly on the display screens of the computers in the two configurations, a mapping of X=Xmax−Xscreen; Y=Ymax−Yscreen is needed in one of the configurations where Xmax and Ymax are the maximum X and Y coordinates of the display screen and where X and Y are coordinate values in one of the configurations when Xscreen and Yscreen are corresponding coordinate values in the other configuration.

FIG. 5 shows flowchart 400 used to illustrate the broad logical flow of a routine to handle button function re-assignment, coordinate mapping and display re-orientation in the hand-held computer of the present invention. Flowchart 400 is but one example of a method to handle switching between left held and right held configurations and it will be readily apparent that other flowcharts accomplishing the same task are possible. Flowchart 400 is entered at 402. In a preferred embodiment, the user indicates the configuration, either left held or right held, by inputting a command either with the stylus or through one or more of the buttons. Thus, in a the preferred embodiment, the routine of flowchart 400 is invoked when application software determines that the user has indicated a change in the configuration.

Another possibility would be to have the position of the hand-held computer automatically sensed. That is, a device such as a mercury switch or other gravity sensing device could be used to determine which end of the hand-held computer was being held upwards and which end was being held downwards. Using this information, the hand-held computer of the present invention could make an assumption about which hand was being used to hold the hand-held computer and automatically configure itself for left held and right held operation.

Once entered, the routine of flowchart 400 executes step 404 which checks to see whether a left held configuration is in effect. If a left held configuration is in effect, execution proceeds to step 406 where the processor sets the display controller to write display image information in a standard orientation on the display screen. Next step 408 is executed where functions are assigned to buttons and according to a first pattern. As shown in the box corresponding to step 408, button 1 will invoke function 1, button 2 will invoke function 2, and button 3 will invoke function 3. The functions themselves are arbitrary. For example, in accordance with the example discussed in connection with FIGS. 4A and 4B, function 1 is the UP function, function 2 the SELECT function and function 3 the DOWN function. Button 1 is button 384, button 2 is button 386 and button 3 is button 388.

After step 408, step 409 is executed to calculate the relative X, Y coordinates given position values from the position sensor. For example, if the coordinate axes 392 of FIG. 4A are defined as the reference for screen position values (Xscreen, Yscreen) that the position sensor outputs, then the relative X, Y coordinates are merely the Xscreen, Yscreen coordinates.

After step 409, the routine of flowchart 400 is exited at step 410.

Returning to step 404, and assuming that the left held configuration is not in effect, execution proceeds to step 412 where the processor sets the display controller to write display image information in a "flipped" orientation, that is, upside-down from the orientation set at step 406. After step 412 completes, execution proceeds to step 414 where functions are assigned to buttons as follows: button 1 invokes function 3, button 2 invokes function 2, and button 3 invokes function 1. The function assignment in step 414 is in accordance with discussion above in connection FIGS. 4A and 4B so that index fingers of either left held or right held operating configurations perform the same function, middle fingers perform the same function, and ring fingers perform the same function.

After completing step 414, the routine of flowchart 400 proceeds to step 415 where relative X, Y coordinates are calculated by subtracting the Xscreen, Yscreen coordinate values from Xmax, Ymax, respectively. This ensures that points on the display screen expressed in relative coordinates are the same with respect to the user's orientation regardless of left held or right held configuration. For example, relative coordinates of 0, 0 are always at the lower left of the display screen as viewed by the user.

Next, flowchart 400 terminates execution at step 410.

Next FIGS. 6A and 6B, along with the flowchart of FIG. 7, will be discussed to describe how button presses modify stylus input in the present invention.

Figure 6A:
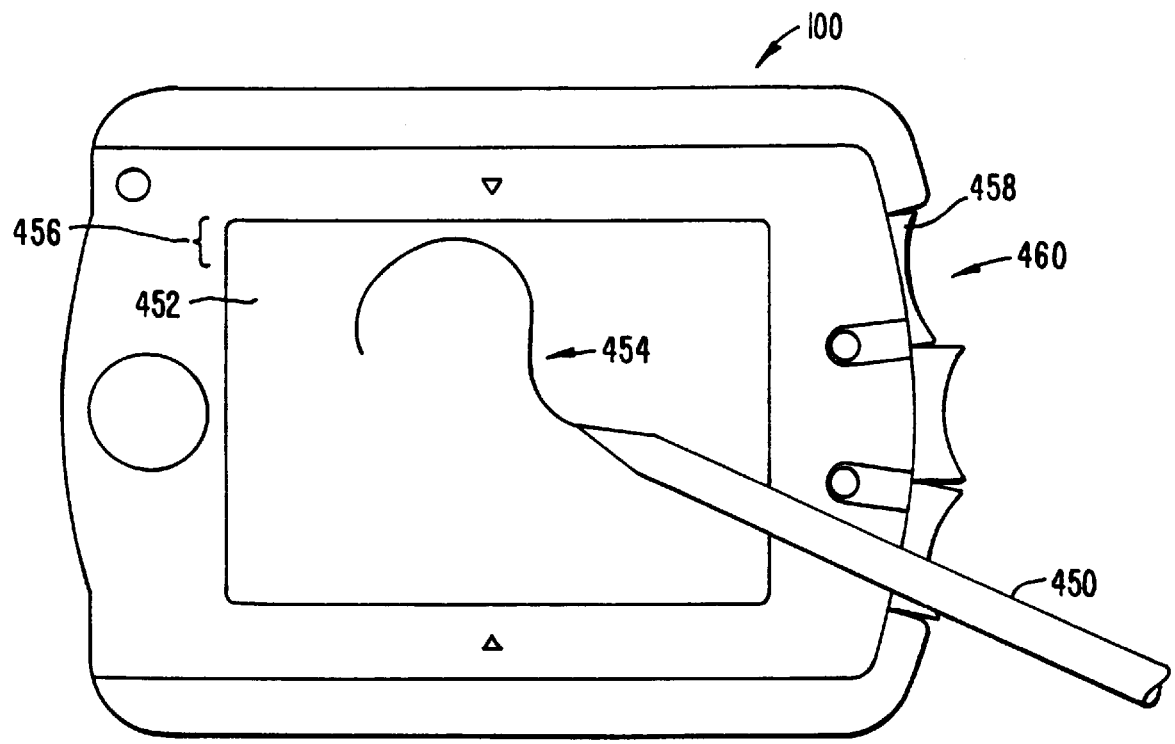
FIG. 6A shows the stylus being used to draw on the touch-sensitive display screen with a control button in a first position.

In FIG. 6A, stylus 450 is shown being used to draw on touch-sensitive display screen 452. Stylus 450 has drawn an arc 454 as shown in FIG. 6A. In drawing arc 454, stylus 450 enters a region at 456 near the top of display screen 452. In order to draw arc 454, control button 458 is depressed throughout the course of the drawing (for ease of illustration, the user's hands are not shown). Control button 458 is depressed in the direction shown by arrow 460.

Figure 6B:
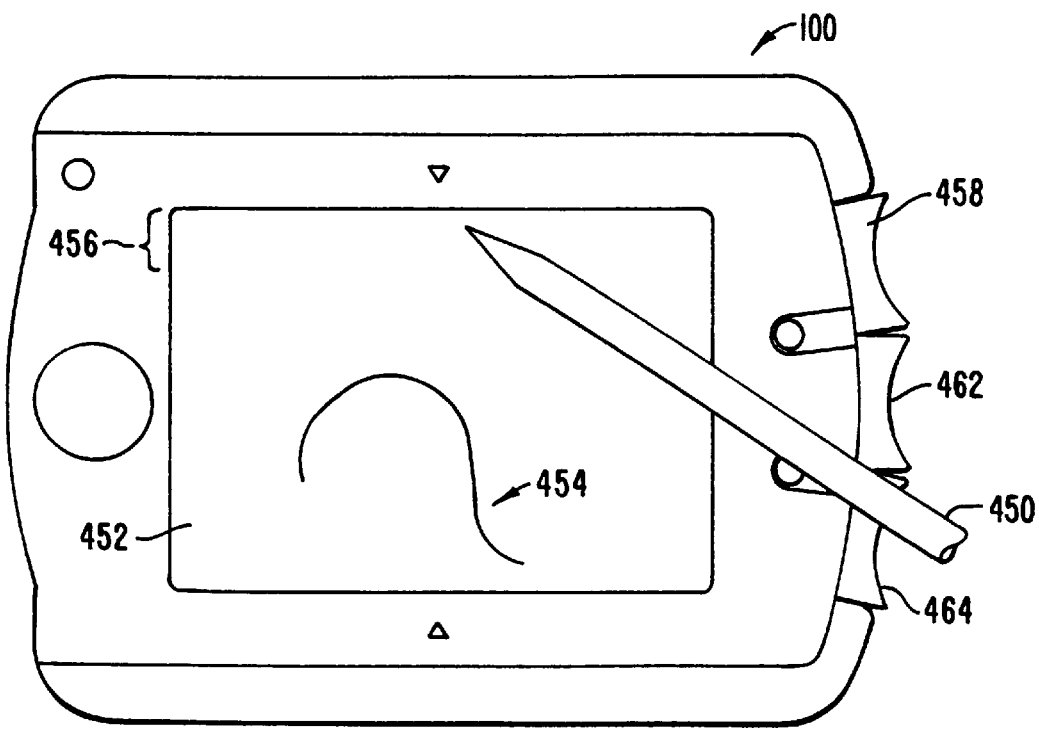
FIG. 6B shows the stylus being used to draw on the touch-sensitive display screen with a control button in a second position.

FIG. 6B shows hand-held computer 100 and stylus 450 once again. This time, however, control button 458 is shown in its extended, or un-depressed, position. With control button 458 in its extended position, and with stylus 450 contacting display screen 452 in the region near the top of the display screen at about 456, the display screen acts as a scrolling window over an image that is larger than the size of display screen 452. FIG. 6B shows the display at some time after stylus 450 has been placed at about region 456 at the top of the display screen. When software in the system illustrated in FIG. 2 detects that stylus 450 is in region 456 and that control button 458 is in its extended position, the display image is scrolled, in this case downwards towards the bottom of the screen to correspond with the "window" of the display screen scrolling upwards. Arc 454 would eventually be scrolled off toward the bottom of display screen 452 in a manner that is well-known in the art.

Thus, the manipulation of control button 458 is seen to affect the manner in which the hand-held computer processes input signals from the stylus. Similar to the above discussion, scroll sensitive regions to the right, left and bottom of display screen 452 are implemented in a preferred embodiment, so that, with control button 458 in an extended position, scrolling in any of four directions is possible. By making scrolling regions overlap near the corners of the display, diagonal scrolling is possible.

Another possibility is to allow a user to "scale" the image in the display screen, thus allowing for "zooming" in and out to bring more or less of the image into the display screen area. This is accomplished similar to window scrolling, with, for example, a button being designated as a "scale button" and depressing this button causing stylus position information to be interpreted as a scale speed and scale direction indication. A stylus position near the top of the display screen with the scale button depressed zooms out, a stylus position near the bottom of the display screen zooms in. If the stylus position is very near the top or bottom of the display screen then the zoom would be fast out or fast in, respectively.

Of course, any of control buttons 458, 462, or 464 could be used to modify the stylus input as described above. In a preferred embodiment, control button 458 is used as described while control button 462 forces "straight line" drawing, that is when control button 462 is depressed, the user may draw a line on the display which will be forced to be a straight vertical or horizontal line. Control button 464 is used to exit the drawing program when depressed.

Many other possibilities that provide for button presses to affect stylus input are possible. For example, when a stylus movement is used to represent a character (e.g., arc 454 of FIG. 6A could represent a letter of the alphabet), depressing a button at some time during or after drawing the arc could cause the character to be designated as a character that is capitalized, underlined, bold-faced, etc. When the hand-held computer is used to input standard hand-printed characters then a button press is used to signify that a character has been completed. This is necessary since the computer would be unable to automatically detect whether a character is, for example, an uncompleted "E" or a completed "F".

Figure 7:
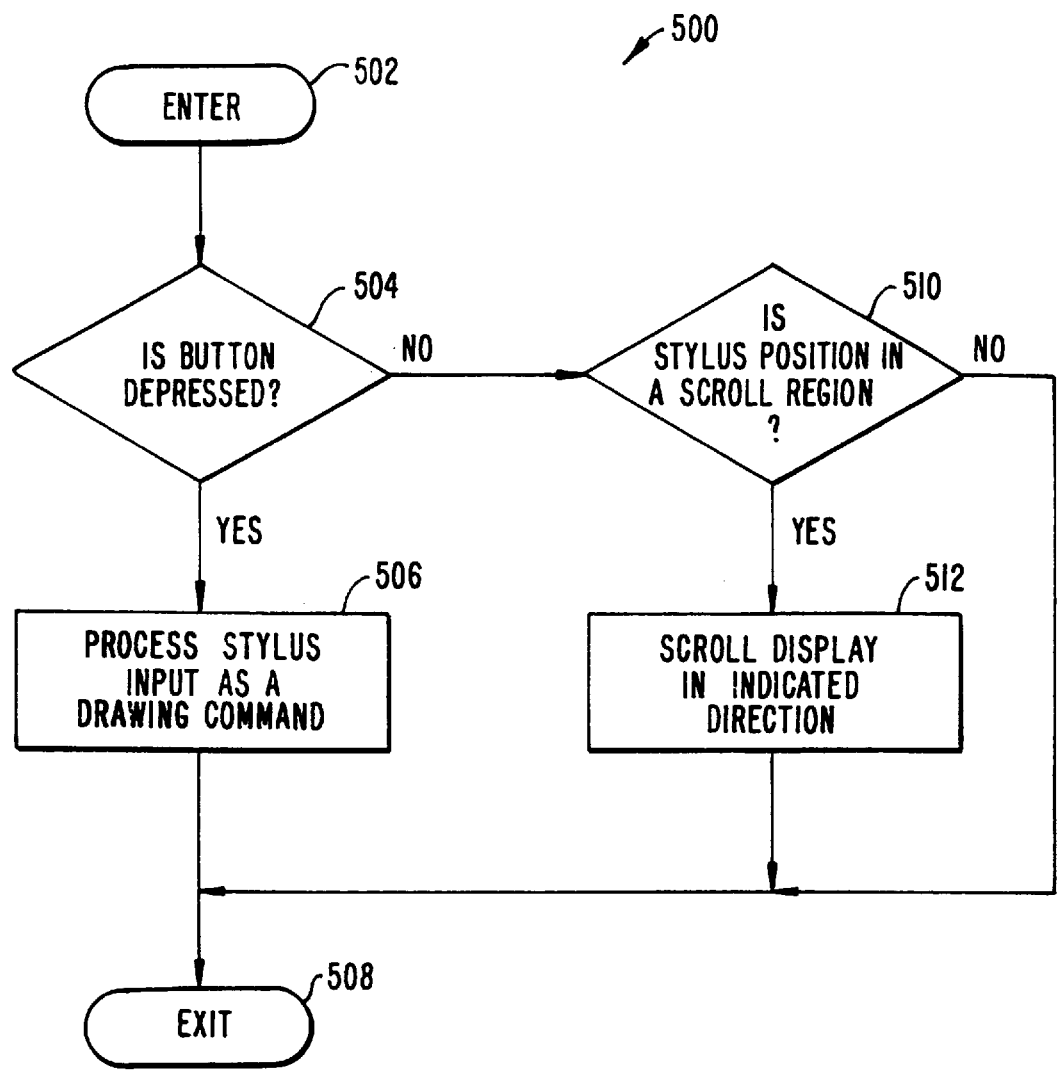
FIG. 7 shows a flowchart for a routine to interpret stylus input according to a control button press.

FIG. 7 shows flowchart 500 that illustrates the steps of a routine to interpret stylus input according to a button press as discussed above in connection with FIGS. 6A and 6B.

The routine of flowchart 500 is entered at 502. In a preferred embodiment, this routine is called when stylus input 176 of FIG. 2 sends position information about a change in stylus position to processor 180. Processor 180 relays the information to a processor in distributed system 198, such as processor 186, that is executing an application program comprising a drawing utility.

After entry, step 504 is executed to test whether a button, such as control button 458 of FIG. 6A, as discussed above, is depressed. Button sensing information is passed to the application program in a manner similar to the passing of the stylus information. If the button is detected as depressed, then execution proceeds to step 506 where the new stylus position is used to invoke a drawing command such as drawing a line, pulling down a menu with options, erasing a mark, etc. After the drawing command has been accomplished, execution of the routine of flowchart 500 is exited at 508.

If, at step 504, the button is sensed as not depressed, execution continues to step 510 where a test is made as to whether the stylus position is in a scroll region of the screen such as region 456 of FIG. 6A. If not, the routine exits at 508. However, if the stylus position is in a scroll region then software instructions are executed at step 512 to scroll the display in the indicated direction. The routine then exits at step 508.

Thus, the routine of FIG. 7 implements a method for allowing stylus input to be processed in different ways depending on the state of a control (the button) in the present invention.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement software used in the disclosed invention. Also, the specific logic presented to accomplish tasks within the present invention may be modified without departing from the scope of the invention. In some embodiments, additional steps may be included to those steps illustrated by the flowcharts of FIGS. 5 and 7. Alternatively, steps may be omitted from the flowcharts of FIGS. 5 and 7 without departing from the scope of the present invention. The flowcharts illustrate but one of many possible implementations of source code organizations, instructions and data structures which may be used to implement the present invention.

Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A hand-held computing device for left and right single-handed operation, the hand-held computing device comprising:
    a substantially rectangular elongated housing having a top surface and an axis, wherein the axis is parallel with the elongated dimension of the top surface and centered within the housing;
    a display screen coupled to the top surface of the housing;
    a first side of the housing oriented substantially perpendicular to the axis;
    one or more input means coupled to the first side and arranged symmetrically with respect to the axis, wherein the input means comprises first and second buttons on the first side arranged symmetrically with respect to the axis;
    top and bottom sides of the housing, wherein the top and bottom sides are adjacent to the first side and opposite each other;
    control signal means for indicating first and second modes of operation;
    processing means coupled to the buttons and the control signal for selectively performing first and second functions, wherein, in the first mode, the processing means performs the first function when the first button is activated and performs the second function when the second button is activated, and wherein, in the second mode, the processing means performs the first function when the second button is activated and performs the second function when the first button is activated; and
    wherein the hand-held computing device is grasped by a hand so that the thumb of the hand contacts the top side and the little finger of the hand contacts the bottom side.

2. The hand-held computing device of claim 1, further comprising:
    left/right sensing means coupled to the control signal means for causing the control signal means to indicate the first mode when the device is held in the left hand and for causing the control signal means to indicate the second mode when the device is held in the right hand.

3. The hand-held computing device of claim 2, wherein the left/right sensing means comprises a manual switch.

4. The hand-held computing device of claim 2, wherein the left/right sensing means comprises gravity sensing means for sensing the orientation of the device with respect to the direction of the force of gravity of the earth.

5. The hand-held computing device of claim 4, wherein the gravity sensing means includes a mercury switch.

6. The hand-held computing device of claim 1, further comprising:
    display control means coupled to the control signal means and coupled to the display screen, wherein the display control means generates a first display when the control signal means indicates the first mode, and wherein the display control means generates a second display when the control signal means indicates the second mode.

7. The hand-held computing device of claim 6, further comprising
    the display control means including second display generation means for generating the second display based on the first display so that the second display is substantially the same as the first display turned upside-down.

8. The hand-held computing device of claim 1, further comprising
    position sensing means coupled to the display screen for sensing the position of an object brought into close proximity to the display screen, wherein the position sensing means outputs position coordinates relative to a first position on the display screen; and
    coordinate transforming means for transforming the position coordinates, wherein the coordinate transforming means performs a first transformation on the position coordinates when the control signal means indicates the first mode of operation, and wherein in the coordinate transforming means performs a second transformation on the position coordinates when the control signal means indicates the second mode of operation.

9. A hand-held computing device operable by a human user, the device comprising:
    an elongated housing having a central axis parallel to the direction of elongation;

a top surface of the housing substantially parallel to the central axis;

a display screen coupled to the top surface, wherein the display screen is arranged symmetrically about the central axis;

a primary side of the housing substantially perpendicular to the central axis;

first, second and third buttons arranged in a row along the primary side, wherein the arrangement of buttons is symmetrical about the central axis;

top and bottom sides of the housing, wherein the top and bottom sides are adjacent to the first side and opposite each other;

wherein the hand-held computing device is grasped by a hand of the human user so that the thumb of the hand contacts the top side and the little finger of the hand contacts the bottom side;

processing means coupled to the buttons for processing signals derived from the buttons;

wherein the device is operable in a first position and a second position;

the first position comprising the device held in the user's left hand wherein the user's left first finger operates the first button, left middle finger operates the second button and left ring finger operates the third button; and the second position comprising the device held in the user's right hand wherein the user's right first finger operates the third button, right middle finger operates the second button and right ring finger operates the first button;

the device further comprising:
  position sensing means for detecting whether the device is in the first or second position; and
  configuration means coupled to the position sensing means for assigning functions to the buttons in a first order when the position sensing means detects that the device is in the first position, and for assigning functions to the buttons in a second order when the position sensing means detects that the device is in the second position.

10. A hand-held computing device comprising:

a housing;

a display screen coupled to the housing;

stylus sensing means for determining the position of a stylus near the display screen, wherein the stylus is manipulated by a human user;

input means coupled to the housing, wherein the input means is responsive to manipulations by a human user to indicate first and second stylus modes;

processing means within the housing, the processing means coupled to the display screen, stylus sensing means and input means, wherein the processing means controls the display of information on the screen in response to signals from the stylus sensing means and the input means; and stylus mode control means responsive to the input means for causing the processor to display a first image in response to a given stylus manipulation when the first stylus mode is indicated, and for causing the processor to display a second image in response to the same given stylus manipulation when the second stylus mode is indicated.

11. The hand-held computing device of claim 10, further comprising drawing means coupled to the processor for drawing on the display screen in response to signals from the stylus sensing means;

memory means coupled to the processor, the memory means including an image stored in the memory means, wherein a portion of the image is displayed on the display means;

window scrolling means coupled to the processor for displaying additional portions of the image on the display screen in response to signals from the stylus sensing means by shifting the currently displayed image away from an edge of the display screen and displaying additional portions of the image in the area between the shifted image and the edge of the display screen; and the stylus mode control means including means for selectively sending signals to the drawing means when the input means indicates the first stylus mode, and for selectively sending signals to the window scrolling means when the input means indicates the second stylus mode.

12. The hand-held computing device of claim 10, further comprising
  the stylus mode control means including case control means for causing the processor to interpret signals from the stylus sensing means as indicating a lower case letter when the input means indicates the first stylus mode, and for causing the processor to interpret signals from the stylus sensing means as indicating an upper case letter when the input means indicates the second stylus mode.

13. The hand-held computing device of claim 10, further comprising:
  the stylus mode control means including letter separation means for causing the processor to designate previously received signals from the stylus sensing means as a completed character.

14. The method of claim 10, wherein the first image is a character and the second image is the underlined character.

15. The method of claim 10, wherein the first image is a lower case letter and the second image is an upper case letter.

16. The method of claim 10, wherein the first image includes a character in an alphabet from a first language and wherein the second image includes a character in an alphabet from a second language.

17. The method of claim 10, wherein the first image is a character and the second image is the character in bold.

18. The method of claim 10, wherein the first image is a character and the second image is the character italicized.

19. A method for processing input signals in a hand-held computer, the hand-held computer including a housing having a processor, memory, display screen, stylus sensor and stylus control; wherein the housing is substantially rectangular and elongated and has top and bottom sides along the elongated dimension; wherein the hand-held computer is grasped by a hand so that the thumb of the hand contacts the top side and the little finger of the hand contacts the bottom side wherein the stylus sensor senses the position of a stylus manipulated by a human user's first hand, wherein the stylus control is operable by the human user's second hand to indicate at least two states, wherein the processor is coupled to the memory, display screen, stylus sensor and input control, wherein one or more locations in the memory correspond to locations on the display screen, the method comprising the steps of:
  accepting signals from the stylus control to indicate first state;

accepting signals from the stylus sensor to indicate a first position on the display screen;

using the processor to determine a first memory location corresponding to the first position;

using the processor to display mark on the display screen at the first position by writing data to the first memory location;

accepting signals from the stylus control to indicate a second state;

accepting signals from the stylus sensor to indicate a second position on the display screen;

using the processor to translate the second position into a scrolling direction; and using the processor to scroll the displayed mark on the display screen in accordance with the scrolling direction.

20. A hand-held computing device for left and right single-handed operation, the hand-held computing device comprising:

a substantially rectangular elongated housing having a top surface and an axis, wherein the axis is parallel with the elongated dimension of the top surface and centered within the housing, the housing substantially fitting within the palm of a human hand so that when the housing is held the fingers are curved around the housing;

a display screen coupled to the top surface of the housing;

a first side of the housing oriented substantially perpendicular to the axis;

one or more input means coupled to the first side and arranged symmetrically with respect to the axis;

top and bottom sides of the housing, wherein the top and bottom sides are adjacent to the first side and opposite each other;

a button slideably coupled to the housing and operable by a finger of the holding hand, wherein the direction of slide of the button is substantially from the second to the first knuckle of the operating finger;

a convex surface integral to the button and facing the operating finger, wherein the convex surface substantially follows the curved shape of the operating finger; and wherein the hand-held computing device is grasped by a hand so that the thumb of the hand contacts the top side and the little finger of the hand contacts the bottom side.

21. A hand-held computing device comprising a housing sized to be held in a right hand;

control means coupled to the housing at an end of the housing so that the control means is operated by the fingers of the right hand, wherein the control means includes first, second and third buttons operated by the right index finger, right middle finger and right ring finger, respectively, wherein the right thumb contacts the top side of the housing and the right little finger contacts the bottom side of the housing;

a display screen coupled to the housing so that the display screen is facing outward from the palm of the right hand in a normal orientation when the fingers of the right hand are operating the control means, wherein the display screen and buttons are symmetrically oriented along an axis; and wherein the orientations of the display screen and control means are such that when the device is held in a left hand the display screen is turned upside down and the left fingers operate the control means such that the first, second and third buttons are operated by the left ring finger, left middle finger and left index finger, respectively, wherein the left thumb contacts the top side of the housing and the left little finger contacts the bottom side of the housing.

* * * * *